United States Patent Office 3,117,974
Patented Jan. 14, 1964

3,117,974
PHTHALOCYANINE PIGMENTS AND PROCESS
THEREFOR
Leon Katz, Springfield, Melvin N. Turetzky, Elizabeth, and Volney Tullsen, Westfield, N.J., assignors to General Aniline & Film Corporation, New York, N.Y., a corporation of Delaware
No Drawing. Filed Dec. 30, 1958, Ser. No. 783,716
5 Claims. (Cl. 260—314.5)

This invention relates to improved phthalocyanine blue pigments, and more particularly, to the production of phthalocyanine blue pigments having improved resistance to flocculation.

Phthalocyanine blue pigments are various physical forms of the copper derivatives of tetrabenzotetrazoporphine which may contain small amounts of chlorine. These pigments have great commercial significance because of purity of shade and outstanding general fastness properties. They do, however, suffer from certain deficiencies which have limited more general utilization.

One of the main deficiencies of phthalocyanine blue pigments is their tendency to flocculate. Flocculation may be defined as a dispersion failure in which the pigment particles in a coating composition coalesce to give a system of inadequate strength and shade. A paint, enamel or lacquer which flocculates is practically useless since the amount of mechanical action applied at the point of application will to a large degree determine the shade and strength developed. Thus, a brushing application will vary the strength depending upon the amount of localized work done and will normally give a striated and streaky finish. A spray application of a flocculating composition usually gives high strength and adequate shade because of the deflocculation effect of spraying. The sprayed film can reflocculate however, if the film is thick or if the speed with which it sets is slow as contrasted with the rate at which flocculation occurs. When identical results are obtained with a pigmented enamel regardless of whether the enamel is sprayed on a panel under pressure, brushed on the panel or simply poured on the panel, such results are generally regarded by paint technologists as proof that the pigment is non-flocculating.

Another deficiency of phthalocyanine blue pigments involves their tendency to form crystals on exposure to aromatic solvents. Thus, in paints, enamels, and lacquers containing aromatic solvents the strong brilliant blue shade of the products immediately after manufacture is not stable and degenerates to weak and dull shades on ageing. The pigments have therefore been characterized as having poor "can stability." This deficiency has been minimized and in some cases avoided completely by formulating the coating compositions without aromatics. This procedure is generally unsatisfactory since it precludes the use of cheap and versatile solvents.

Partial solutions to the problems of crystallization and flocculation of phthalocyanine blues have been described. Thus, the physical characteristics of the pigmentary particles have been modified so as to minimize surface forces which result in flocculation and solubility effects which convert very small particles to large crystals. The method (U.S. Patent 2,486,351) used to achieve this result involves grinding the phthalocyanine blue with a crystallizing solvent and extractable grinding aid such as salt. The product obtained shows stability to aromatic solvents and does not tend to flocculate but a profound shift in shade toward the green occurs in processing. This shade shift excludes the product from many applications and is thus very undesirable. Another and perhaps even more drastic disadvantage of this mode of operation lies in processing economics. The operating characteristics of the process are such that long time cycles are involved in expensive explosion proof equipment, a solvent recovery system must be available, and special care and precautions must be exercised to eliminate all traces of solvent as well as salt from the final product.

Another method used to control crystallization and flocculation of phthalocyanine blue pigments involves incorporation of various tin phthalocyanines with chlorine containing copper phthalocyanine. (U.S. Patents 2,476,-950–1, 2). This method suffers from serious disadvantages because the tin phthalocyanine cannot be acid pasted in large scale operations with the copper phthalocyanine but must be salt ground separately much as indicated above. The above described salt grinding disadvantages are therefore applicable. Furthermore, the conventional method for preparing tin phthalocyanine gives low yields which leads to disadvantageous costs.

A method has been described for control of flocculation (U.S. Patent 2,526,345) in which a small amount of monosulfonated copper phthalocyanine is blended with copper phthalocyanine. This procedure is deficient because it does not stabilize to crystallization. In addition to this, the manufacture of a monosulfo copper phthalocyanine is a very difficult matter in large scale operation. The difficulty lies in attaining the correct degree of sulfonation. When less than one sulfo group is introduced insufficient stabilization occurs. When more than one sulfo group is present in the stabilizer, water sensitivity results and the product loses the water fastness which is characteristic of phthalocyanine blue.

Another method which has been proposed to overcome flocculation without modifying the crystallizing characteristics involves coating the pigment with aluminum benzoate. (U.S. Patent 2,327,472). This method suffers from the disadvantage that the resulting product contains a relatively small amount of color because of the large percentage of stabilizer needed. Furthermore, the stabilizer may in some cases be reactive and adversely affect the properties of the finished coating composition.

It is an object of this invention to provide a process for producing a phthalocyanine blue pigment with increased resistance to crystallization and flocculation which will not be subject to the above disadvantages. It is another object of this invention to provide a phthalocyanine blue pigment with increased resistance to crystallization and flocculation when incorporated into a surface coating composition. Still another object of this invention is the provision of a simple, safe and economical method for producing a phthalocyanine blue pigment with increased resistance to crystallization and flocculation. Other objects and advantages will appear as the description proceeds.

The attainment of the above objects is made possible by the present invention which includes a process comprising treating a copper phthalocyanine compound dissolved in concentrated sulfuric acid with about 0.02 to 5 parts of paraformaldehyde per part by weight of said compound at an elevated temperature, and the product of such a process and phthalocyanine coloring compositions containing such product. It has been found that the process of this invention is easily and readily carried out to produce products which are resistant to crystallization and flocculation and which impart resistance to crystallization and flocculation to coloring compositions in which it is admixed with copper phthalocyanine or partially chlorinated copper phthalocyanine. The exact mechanism by which such improved properties are obtained, or the exact nature of such products, are not definitely known although it is theorized that in some instances methylol compounds may be formed and it is possible that dimeric or polymeric methylene derivatives are obtained. Regardless of the mechanism of the process or the structure or nature of the products, the process of the present invention enables the production of phthalocyanine coloring compositions having little or no tendency to crystallize or flocculate when incorporated into surface coating compositions.

The present process is equally applicable to unsubstituted copper phthalocyanine and to copper phthalocyanine containing up to 10% by weight of chlorine or bromine or part chlorine and part bromine. It will accordingly be apparent that the copper phthalocyanine compound to be stabilized by the present process may be substituted by from 0 to 10% by weight of the chlorine or bromine. Chlorinated, brominated, and chlorobrominated copper phthalocyanine compounds and their methods of production are well known in the art. For example, they may be produced by employing suitable proportions of chlorinated or brominated reactants leading to the copper phthalocyanine compound, or by treatment of copper phthalocyanine with gaseous chlorine or bromine in a eutectic mixture of aluminum chloride and sodium chloride. Substituents other than chlorine and/or bromine may also be present in the copper phthalocyanine molecule. These substituents have only a minor influence on the crystallization and flocculation characteristics of the final product. Their only influence is to modify the shade slightly.

In carrying out the process, the copper phthalocyanine compound to be stabilized is dissolved in routine manner in sufficient concentrated sulfuric acid to yield a fluid solution. The sulfuric acid may be employed in concentrations ranging from about 90% to 100%, preferably about 96% to 100% by weight. Lower concentrations may conceivably be employed but require unduly prolonged time cycles. Higher concentrations (oleum) promote sulfonation of the copper phthalocyanine compound.

The treatment of the copper phthalocyanine solution in sulfuric acid with paraformaldehyde may be carried out at temperatures of from 50 to 120° C., more preferably 85 to 100° C. and in most cases 90 to 95° C. Here again, lower temperatures require unduly prolonged time cycles while higher temperatures promote sulfonation. The duration of treatment may range from about ½ to 8 hours, treatment at 90 to 95° C. usually involving a time cycle of about 2 to 4 hours. It will of course be understood that the concentration of the sulfuric acid and of the phthalocyanine compound dissolved therein, the temperature of treatment, the duration of treatment, the nature of the phthalocyanine compound, and the proportions of phthtalocyanine compound to paraformaldehyde employed in any particular instance are interdependent and must be adjusted for the attainment of the desired results.

The amount of paraformaldehyde to be added to the phthalocyanine solution in accordance with the present invention may vary from about 0.02 to 5 parts, and preferably from about 0.25 to 2.5 parts per part by weight of the copper phthalocyanine compound being stabilized. Within these ranges, higher proportions of paraformaldehyde result in progressively greener shades of blue in the treated product. A similar shade change is also obtained when the duration of the present treatment is prolonged within or beyond the above mentioned range of duration.

After completion of the above described treatment of the copper phthalocyanine compound with the paraformaldehyde, the treated phthalocyanine compound is separated from the reaction medium in any desired manner, as for example by drowning the sulfuric acid solution of the treated phthalocyanine compound in cold water, adding cold water in sufficient amount to the reaction medium, or the like. The precipitated treated compound is then isolated as by filtering and washing.

In accordance with a preferred embodiment of this invention, phthalocyanine blue coloring compositions of increased stability to crystallization and flocculation are obtained when copper phthalocyanine compounds treated in accordance with the above described process are admixed with untreated copper phthalocyanine compounds in even small proportions as low as about 5% by weight of the coloring composition. It will thus be apparent that the present invention also includes the provision of a copper phthalocyanine coloring composition containing at least 5% by weight of a copper phthalocyanine compound treated with paraformaldehyde in accordance with the process of this invention. While proportions of such treated copper phthalocyanine compound in the coloring composition may range from about 5 to 100%, proportions of about 20 to 60% are usually found most desirable. In such coloring compositions, the untreated copper phthalocyanine compounds correspond to those described hereinabove as being advantageously treated with paraformaldehyde in accordance with the process of this invention. It will also be understood that mixtures of different copper phthalocyanine compounds may be treated by the present process and may also be admixed with the products of such process.

The following examples, in which parts are by weight, unless otherwise indicated, are only illustrative of the instant invention and are not to be regarded as limitative.

*Example 1*

100 parts copper phthalocyanine
1000 parts 100% sulfuric acid
167 parts paraformaldehyde The copper phthalocyanine is dissolved in the sulfuric acid by stirring for 30 minutes at 50° C. The paraformaldehyde is then added over about 30 minutes during which period the temperature is allowed to rise to 95° C. The mixture is stirred at 90 to 95° C. for 2 hours and then poured into a mixture of 3500 parts of ice and 3500 parts of water. The product is isolated by filtering and washing.

The resulting blue pigment is incorporated by flushing into a commercial alkyl paint vehicle to produce a concentrated paste which is used to tint a white alkyd enamel. This light blue enamel is tested by applying it to steel panels. Identical results are obtained whether the enamel is sprayed on the panel under pressure, brushed on the panel or poured on the panel. A pigment made according to the above method but without the paraformaldehyde is also tested by incorporating it in a white alkyd enamel. The blue enamel from the untreated pigment is sensitive to the method application. For example, when it is poured onto a panel, the coating is much less intensely colored than when it is sprayed on the panel. In addition to this demonstrated resistance to flocculation, the product of this example also is resistant to crystallization.

*Example 2*

The same method as that of Example 1 is used except that the reaction mixture is stirred for four hours rather than two hours. The resulting blue pigment has the same desirable non-crystallizing and non-flocculating properties as the pigment of Example 1 and is noticeably greener in shade.

*Example 3*

150 parts of copper phthalocyanine containing about 5% of chlorine is dissolved in
1500 parts of 100% sulfuric acid. To this is added
60 parts of paraformaldehyde The mixture is heated and stirred until the desired properties are obtained. A typical period is 2 hours at 90° C. The product is recovered by pouring the reaction mass into 10,000 parts of ice and water followed by filtering and washing free of acid. The pigment so produced is non-crystallizing and non-flocculating when used in commercial enamels.

Example 4

One part of a pigment made by the method of Example 3 is mixed with three parts of a commercial copper phthalocyanine blue pigment which flocculates in a particular commercial enamel formulation. The resulting blend of pigments is used to tint this same enamel. The blue enamel made with the blended pigments gives blue coatings which are identical in appearance whether they are applied by dipping or spraying.

This invention has been disclosed with respect to certain preferred embodiments, and various modifications and variations thereof will become obvious to the person skilled in the art. It is to be understood that such modifications and variations are to be included within the spirit and purview of this application and the scope of the appended claims.

We claim:

1. A process for reducing the tendency of copper phthalocyanine compound containing 0 to 10% by weight of a member of the group consisting of chlorine and bromine atoms and mixtures thereof to crystallize and flocculate consisting essentially in dissolving the same in concentrated sulfuric acid and treating the resulting solution at an elevated temperature with about 0.02 to 5 parts of paraformaldehyde per part by weight of said compound.

2. A process as defined in claim 1 wherein said temperature ranges from 85 to 100° C.

3. A process as defined in claim 1 wherein 0.25 to 2.5 parts of paraformaldehyde are employed per part by weight of the said compound.

4. A copper phthalocyanine composition having a reduced tendency to crystallize and flocculate and produced by a process as defined in claim 1.

5. A process for reducing the tendency of copper phthalocyanine compound containing 0 to 10% by weight of a member of the group consisting of chlorine and bromine atoms and mixtures thereof to crystallize and flocculate consisting essentially in dissolving the same in sulfuric acid having a concentration of about 96 to 100% and treating the resulting solution at a temperature of about 85 to 100° C. with about 0.25 to 2.5 parts of paraformaldehyde per part by weight of the said compound.

References Cited in the file of this patent

UNITED STATES PATENTS

| | | |
|---|---|---|
| 2,761,868 | Lacey | Sept. 4, 1956 |
| 2,908,544 | Randall et al. | Oct. 13, 1959 |
| 3,002,845 | Hoelzle | Oct. 3, 1961 |

FOREIGN PATENTS

| | | |
|---|---|---|
| 650,850 | Great Britain | Mar. 7, 1951 |
| 689,153 | Great Britain | Mar. 18, 1953 |

OTHER REFERENCES

Chemistry of Syn. Dyes and Pigments—Lubs. A.C.S. Monograph No. 127, page 617 (Reinhold Publ. Corp., New York (1955)).